United States Patent [19]

Gibson et al.

[11] Patent Number: 4,535,667
[45] Date of Patent: Aug. 20, 1985

[54] SAW CHAIN

[75] Inventors: Duane M. Gibson, Milwaukie; Lewis A. Scott, Lake Oswego, both of Oreg.

[73] Assignee: Omark Industries, Inc., Portland, Oreg.

[21] Appl. No.: 452,092

[22] Filed: Dec. 22, 1982

Related U.S. Application Data

[63] Continuation-in-part of Ser. No. 329,593, Dec. 10, 1981, abandoned, Continuation of Ser. No. 36,842, Aug. 7, 1979, abandoned.

[51] Int. Cl.³ .............................................. B27B 33/14
[52] U.S. Cl. ........................................ 83/830; 83/834; 76/25 A
[58] Field of Search ................. 83/174, 830, 831, 832, 83/833, 834; 299/82, 83, 84; 30/138; 76/25 A

[56] References Cited

U.S. PATENT DOCUMENTS

| | | | |
|---|---|---|---|
| 2,730,143 | 1/1956 | Ryde | 83/834 |
| 2,744,584 | 5/1956 | Stephenson et al. | 83/834 |
| 3,189,064 | 6/1965 | Frederickson | 83/834 |
| 3,260,287 | 7/1966 | Oehrli | 30/138 |
| 3,263,717 | 8/1966 | Silvon | 83/834 |
| 3,469,610 | 9/1969 | Silvon | 83/831 |
| 3,545,508 | 12/1970 | Tupper | 83/833 |
| 3,581,785 | 6/1971 | Neumeier | 83/830 |
| 3,596,689 | 8/1971 | Oehrli | 30/138 |
| 3,921,490 | 11/1975 | Dolata et al. | 83/833 |
| 4,023,453 | 5/1977 | Dolata et al. | 83/174 |

Primary Examiner—Frank T. Yost
Assistant Examiner—Hien H. Phan
Attorney, Agent, or Firm—Klarquist, Sparkman, Campbell, Leigh & Whinston

[57] ABSTRACT

The specification discloses a completely outside sharpenable saw chain of the chisel type in which top plate portions are sharpened on their tops and in which side cutter portions are sharpened on their outer sides. The chain has allochiral cutter teeth each having a top plate portion sloping rearwardly and downwardly and joined along one side edge to a side slitter plate portion sloping rearwardly and inwardly, a bent over shank portion, a body portion and a depth gauge portion, wherein the top plate portion, the side plate portion and the shank portion taken together are generally C-shaped in cross-section. The top plate portion has, at its top, a sharpenable end surface forming a top cutting edge ending in a corner chisel point from which a side cutting edge extends downwardly and rearwardly. The side cutting edge is formed where the sharpenable forward end surface of the side plate portion, oriented toward the outer side of the saw chain, intersects the inner face of said side plate portion. The bottom face of the top plate portion and the inner face of the side plate portion each have a layer of chromium thereon.

21 Claims, 16 Drawing Figures

U.S. Patent   Aug. 20, 1985   Sheet 1 of 3   4,535,667
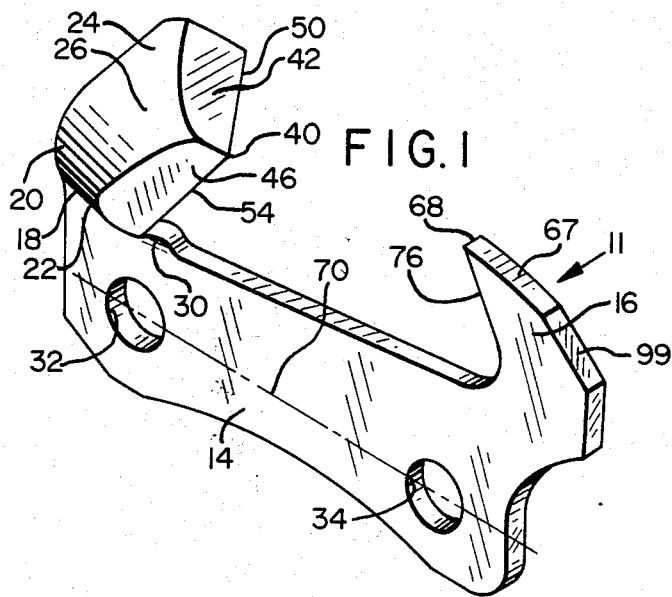
FIG.1
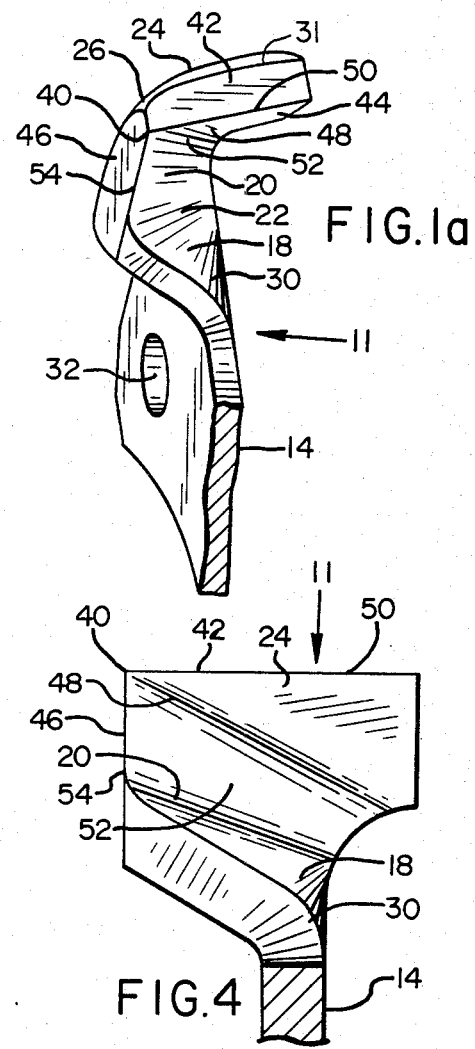
FIG.1a
FIG.4
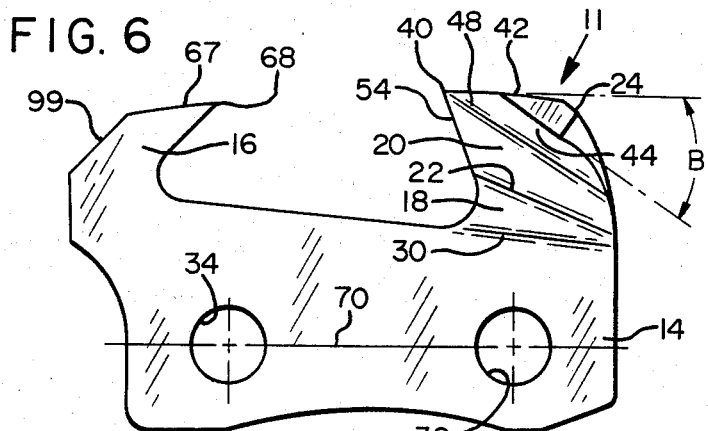
FIG.6
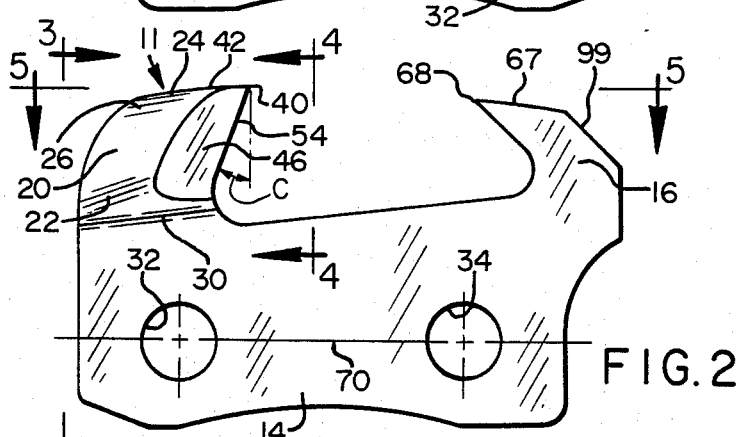
FIG.2
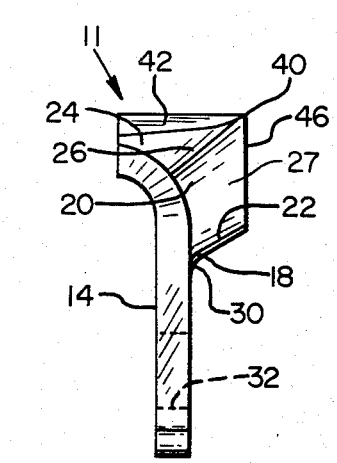
FIG.3
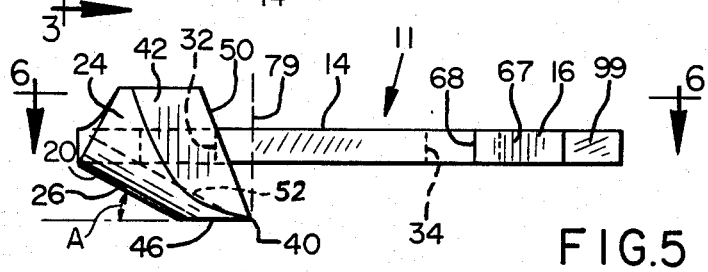
FIG.5

SAW CHAIN

CROSS-REFERENCE TO RELATED APPLICATIONS

This application is a continuation-in-part of our co-pending application, Serial No. 329,593, filed Dec. 10, 1981 for IMPROVED SAW CHAIN which is a continuation of our application, Serial No. 36,842, filed May 7, 1979 for IMPROVED SAW CHAIN. cl BACKGROUND OF THE INVENTION The present invention relates to an improved saw chain and more particularly to a saw chain having an improved outside sharpenable cutter tooth.

Saw chains having chisel-type cutter links, that is, cutter links in which the top plate portion and the side slitter portion form a sharp angle, and, therefore, a sharp corner at the juncture of the top cutting edge and the side cutting edge, are very effective. However, they require expertise in sharpening, and are not nearly so widely used as saw chains of the chipper-type, which have a rounded corner formed by the top cutting edge and the side cutting edge, the rounded corner being less adapted to slitting than the sharp corner of the chisel-type tooth but being sharpenable without the great skill required by the chisel teeth. In each of saw chains disclosed in Silvon U.S. Pat. Nos. 3,263,717 and 3,469,610, Oehrli U.S. Pat. No. 3,260,287 and Frederickson U.S. Pat. No. 3,189,064, there is disclosed a tooth adapted to have its top cutting edge sharpened uniformly with little skill required but the side slitter edges must be hand filed and this tooth does not present an easily maintained sharp corner. Neumeier U.S. Pat. No. 3,581,785 also shows top cutting teeth which can be sharpened easily, but they have no side slitter portions. Dolata el al U.S. Pat. Nos. 3,921,490 and 4,023,453 disclose a saw chain having a twisted tooth which can be top sharpened and a side slitter which can be sharpened at the outside edge. However, both the top edge and the side slitting edge must include such large angles that they are not good cutters and a sharp corner is not provided. Also, the teeth break off easily.

OBJECTS

An object of the invention is to provide a chisel-type saw chain that can be completely sharpened outside.

Another object of the invention is to provide a chisel-type saw chain that is easily sharpened, has a long life and is very efficient in sawing.

A further object of the invention is to provide a saw chain outside sharpenable on its top and one side.

Another object of the invention is to provide a saw chain that is sharpenable only exteriorly.

SUMMARY OF THE INVENTION

In accordance with the present invention, a completely outside sharpenable cutter tooth includes an inwardly and rearwardly sloping side plate portion. The side plate portion has an outwardly oriented, forward end surface that is sharpenable and is disposed in intersecting relation with the inside face of the side plate portion to form a side slitting edge. The tooth also has a top plate portion sloping rearwardly and downwardly and joined to the top of the side plate portion. An upwardly oriented, forward end surface of the top plate portion provides a sharpenable surface disposed in intersecting relation with the bottom face of the top plate portion to form a top cutting edge.

The subject matter which we regard as our invention is particularly pointed out and distinctly claimed in the concluding portion of this specification. The invention, however, both as to organization and method of operation together with further advantages and objects thereof, may best be understood by reference to the following description taken in connection with the accompanying drawings wherein like reference characters refer to like elements.

BRIEF DESCRIPTION OF THE DRAWINGS

FIGS. 1 and 1a are perspective views of an improved chisel-type cutter link forming an embodiment of the invention;

FIG. 2 is a side elevation view of the cutter link of FIG. 1;

FIG. 3 is a rear view of the cutter link of FIG. 1 taken along line 3—3 of FIG. 2;

FIG. 4 is an enlarged, vertical, sectional view taken along line 4—4 of FIG. 2;

FIG. 5 is a top plan view taken along line 5—5 of FIG. 2;

FIG. 6 is a side elevation view taken along line 6—6 of FIG. 5;

DESCRIPTION

Figure 7:
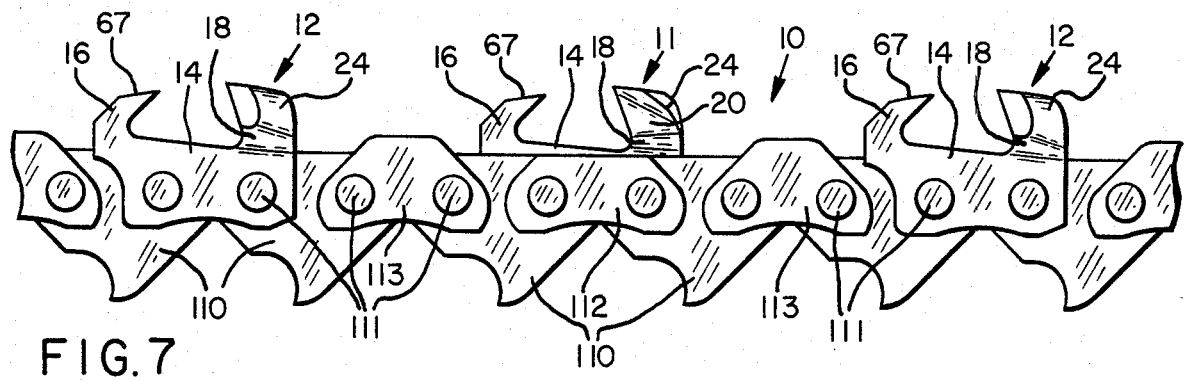
FIG. 7 is a fragmentary, side elevation view of an improved chisel-type saw chain forming an embodiment of the invention and including the link of FIG. 1, showing a sequence and a half of the saw chain.

A completely outside sharpenable saw chain 10 (FIGS. 7 and 8) has novel top and side sharpenable chisel-type cutter links or teeth 11 and 12, each forming one specific embodiment of the invention. The links 11 are identical to the links 12 except that the links 11 are right hand and the links 12 are left hand, i.e. allochiral, and, hence, only the links 11 will be described in detail. Each link 11 (FIGS. 1–6) has a flat body or base portion 14, a depth gauge portion 16, and an integral cutter portion comprising an offsetting shank portion 18, a rearwardly, inwardly and somewhat downwardly sloping, generally flat or slightly rounded side plate portion 20 joined to the shank or offset portion 18 by a rounded, bent portion 22, and a rearwardly and downwardly sloping, flat, top plate portion 24 joined along one side edge thereof to the top edge of the side plate portion 20 by an angular or rounded, bent portion 26. The shank portion is joined to the body portion 14 by a rounded, bent portion 30. The body portion has holes 32 and 34 for rivets. Throughout this description and the claims, for purposes of clarity in describing the cutter links 11 and 12, it will be assumed that the body portions are in upright positions with the top plates uppermost. "Forwardly" means in the direction of chain travel, e.g. to the right in FIG. 2, while "rearwardly" refers to the opposite direction. Also, "inwardly" means toward the longitudinal center plane of the chain and "outwardly" means laterally away from that plane, which plane is assumed to be generally vertical.

The side plate portion 20, at least proximate its forward end, is offset upwardly from body portion 14 by the shank portion 18, and is also offset to one side of the longitudinal centerline of the link. Moreover, the side plate portion 20 is desirably positioned outwardly and upwardly with respect to the outward side of the body portion. Proceeding rearwardly from the forward end surface 46 of the side plate portion 20, the side plate portion slopes inwardly at an acute angle with respect to body portion 14 and also slopes somewhat downwardly.

As hereinafter more fully described, the link is suitably formed of sheet steel of predetermined thickness and therefore the opposite side surfaces of the flat body portion 14 extend in substantially parallel relation to the centerline of the link and to each other. Similarly, the side plate portion has inner and outer substantially parallel surfaces, 52 and 27 respectively, the inner surface facing toward the centerline of the link and the outer surface facing away from said centerline, and has a forward work engaging end surface 46. Of course, the inner and outer surfaces need not be entirely parallel. The forward end surface 46 intersects both inner surface 52 and outer surface 27, but is outwardly facing from the link in generally parallel relation to body portion 14. The end surface 46 is outside sharpenable. Since the side plate portion slopes inwardly at an acute angle, a useful side cutting edge 54 is formed where end surface 46 intersects the inside surface 52 of the side plate portion, the cutting edge 54 being substantially straight and substantially outermost on the side plate portion. It is noted that the side plate portion inside surface 52 extends rearwardly and inwardly at an acute angle with respect to the said end surface 46. The included angle of the side cutting edge, defined by the inwardly sloping side plate portion relative to the vertical center plane of the chain, is large enough to provide a cutting edge 54 that will permit many sharpenings without weakening the side plate portion.

Top plate portion 24 extends inwardly from the upper part of the side plate portion and comprises an integral extension of the side plate portion. The top plate portion, starting at its forward end, extends rearwardly and downwardly toward body portion 14, at an acute angle with respect to the longitudinal centerline of the body portion, and, proceeding transversely outwardly to where it joins the side plate portion, the top plate portion also slopes downwardly.

The top plate portion has lower and upper substantially parallel surfaces 44 and 31 respectively, wherein such upper surface faces away from the longitudinal centerline of body portion 14, and has an upwardly facing forward work engaging end surface 42 intersecting both lower surface 44 and upper surface 31. End surface 42 is outside sharpened and is substantially horizontal. Then, since the top plate portion slopes downwardly, a useful top cutting edge 50 is formed where the upwardly facing forward end surface 42 intersects the lower surface 44 of the top plate portion at an acute angle, the cutting edge 50 being substantially straight and substantially uppermost on the top plate portion. The included angle of the top cutting edge established by the downwardly sloping top plate portion defines a cutting edge 50 that will provide many sharpenings without weakening the top plate portion.

The integrally formed side plate portion and top plate portion roughly describe part of the surface of a cylinder, having an axis extending rearwardly and to the right in FIG. 1. The combined concave inner surface of such cylinder includes the inner surface 52 of the side plate portion and the lower surface 44 of the top plate portion.

The cutting edges 50 and 54 preferably intersect on each link 11, 12 at a sharp point 40 formed at the junction of top plate portion end surface 42, side plate portion end surface 46, and inner surface 48, preferably chrome, of the angular portion 26. Inner or bottom surface 44 of the top plate portion 24 is chromium plated to insure a hard top cutting edge 50 which extends inwardly and somewhat rearwardly from the point 40. Inner surface 52 of the side plate portion 20 also preferably is chromium plated to insure a hard side cutting edge 54. Edge 54 extends somewhat downwardly, and preferably somewhat rearwardly, from the point 40 so that it is hook-like.

While a sharp intersection 40 of edges 50 and 54 is preferred and will tend to be provided by the sharpening method hereinafter outlined, nevertheless a sharp intersection is not required. For example, a cutter in accordance with the present invention is quite operable even though point 40 becomes dull through wear. Alternatively, the edges 50 and 54 may be offset from one another so that linear extensions of straight edges 50 and 54 do not intersect. The intersecting configuration is preferred mainly because of the enhanced effectiveness of a sharp chisel-type cutter as compared with cutters having a rounded corner for example.

Figure 13:
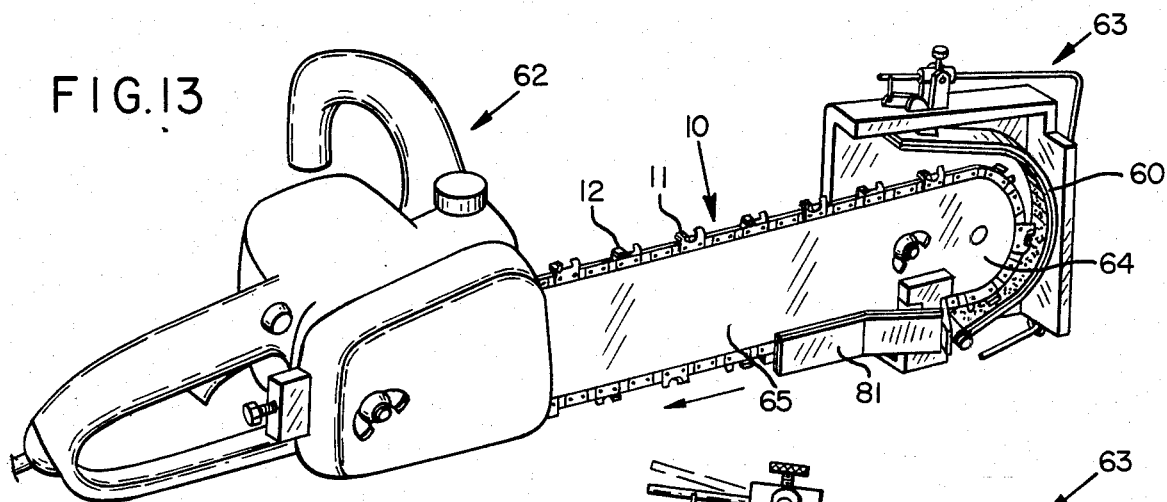
FIG. 13 is a perspective view of a chain saw with the saw chain of FIG. 7 and with a sharpening attachment mounted on a saw bar thereof.
Figure 14:
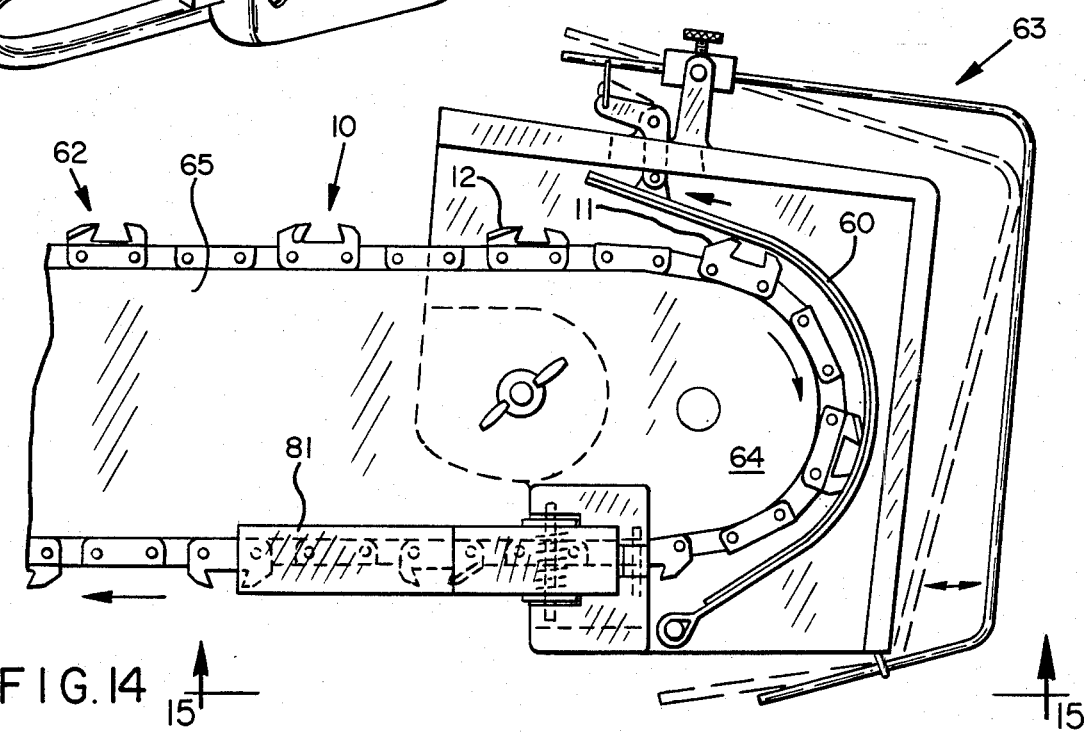
FIG. 14 is a fragmentary, side elevation view of the chain saw and sharpening attachment of FIG. 13; and, FIG. 15 is a bottom plan view taken along line 15—15 of FIG. 14.
Figure 15:
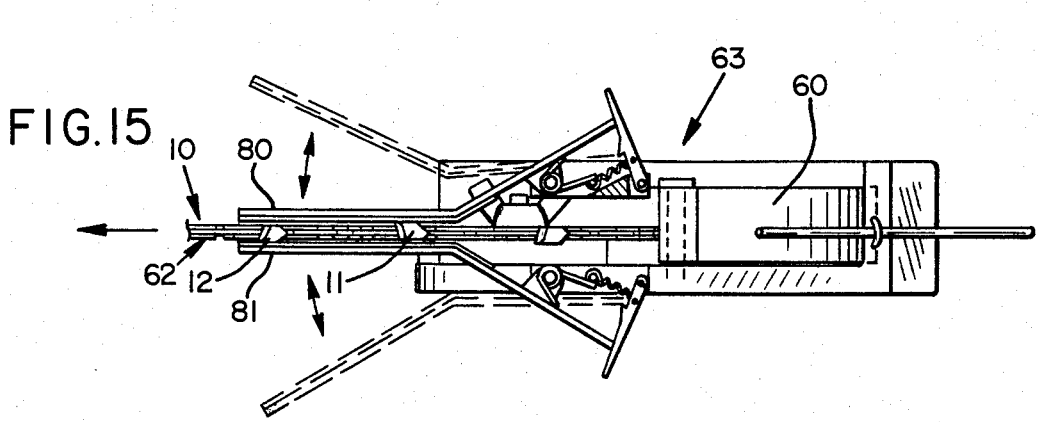

The cutting edges 50 are preferably sharpened by power, and may be sharpened by an arcuate abrasive member 60 (FIGS. 13-15) of a sharpening attachment 63 on a chain saw 62, when the member 60 is pressed toward a nose portion 64 of a saw bar 65 of the chain saw to always engage at least two of the end surfaces 42 as the chain is driven by a sprocket (not shown) of the saw. Arcuate abrasive member 60 is somewhat flexible, including a backing comprising a thin strip of spring metal or the like, and is placed in contact with the saw chain top surfaces by depressing the bail which raises the crank and draws member 60 to the left in FIG. 14. Simultaneously, the member 60 also abrades top surfaces 67 of the depth gauge portions to reduce their height proportionately to the reduction of the height of the cutters by the sharpening. Rear end 68 (FIG. 2) of each depth gauge portion is the gauging portion thereof and is positioned substantially farther forwardly of the midpoint of an imaginary line 70 joining the centers of rivet holes 32 and 34 in the body portion than is the top cutting edge 50 to the rear of that midpoint. As a result, the rear end 68 of each depth gauge portion is always a selected distance lower than the cutting edge 50. The forward slope of rear edge 76 of the depth guage portion 16 and the rearward slope of the bottom surface 44 of the top plate portion are such that the height differential between the rear end 68 and the cutting edge 50 is kept constant even after repeated sharpenings. Preferably, the downward slope of the top plate portion 24 relative to the horizontal (angle B) is from about 30° to about 40°, such that the included angle of the cutting edge is also from about 30° to 40°, being sufficient for defining a substantial top cutting edge which will allow many sharpenings. An angle of about 35° is particularly suitable. With an included angle (b) much smaller than 30° the cutting edge is too thin and insubstantial. Thus the downward slope of the top plate portion is important in providing the cutting device according to the present invention. The top plate portion 24 slopes somewhat upwardly proceeding inwardly from the bent portion 26, to an extent such that the edge 50 forms an angle of about 22° with a line 79 (FIG. 5) normal to the plane of the body portion.

The kerf side cutting edges 54 of the side plate portions 20 of the links 11 and 12 may be sharpened by pressing planar abrasive members 80 and 81 (FIGS. 13-15) against the sides of the saw chain 10 as the chain is driven by the chain saw to abrade the sharpenable end surfaces 46 (FIGS. 1-6. It will be noted that planar abrasive members 80 and 81 are pivotally carried by sharpening attachment 63 and are spring biased against the side sharpening surfaces of the chain during sharpening operation. Members 80 and 81 can alternatively by latched out of sharpening position as shown by dashed lines in FIG. 15. The sharpening faces of the members 80 and 81 are suitably parallel to the body portions 14 of the cutter links 11 and 12 during sharpening or, to increase the hooking configuration of the side cutting edges 54 and to provide some kerf side wall clearance, may be tilted, preferably about 4°, somewhat inwardly proceeding upwardly as viewed in FIGS. 13 and 14. This provides vertical and horizontal relief angles relative to point 40, with point 40 preferably being outermost on the cutter. The surfaces 46 are, of course, planar after members 80 and 81 have been used in this manner for sharpening. The inward slope of the side plate portion 20 relative to the vertical center plane of the chain is from about 30° to about 40°, such that the included angle of the side cutting edge defined by the surfaces 46, 52 is also from about 30° to 40°, being sufficient for defining a substantial side cutting edge which will allow many sharpenings. An angle of about 35° is particularly suitable. With an included angle much smaller than 30° the cutting edge is too thin and insubstantial. Thus the inward slope of the side plate portion is important in providing the cutting device according to the present invention. Although the sharpenable surfaces 46 are conveniently abraded employing members 80 and 81 whereby the sharpenable surfaces 46 are parallel to the chain link longitudinal centerline, it is often preferred to provide surfaces 46 with an initial small back slope are relief, of one or two degrees, during manufacture of the chain. Thus, the surface 46, proceeding straight rearwardly from edge 54, preferably slopes slightly inwardly to provide additional relief. The edge 54 is preferably outermost on the side plate portion.

Figure 9:
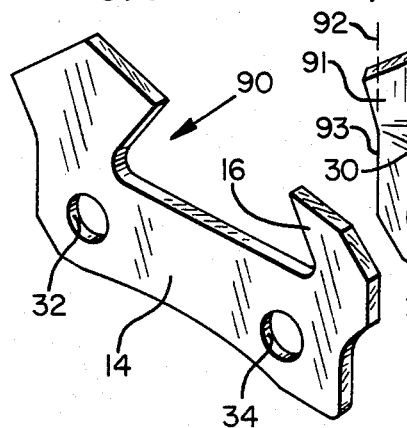
FIGS. 9–12 are perspective views of the several stages of making a cutter link like that of FIG. 1 but of the opposite hand.
Figure 10:
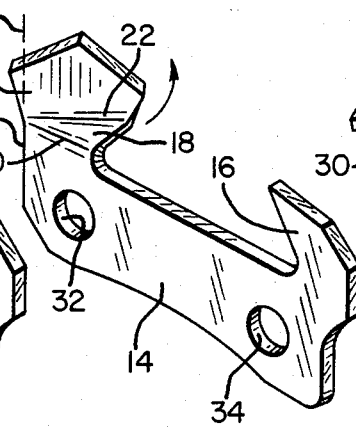
Figure 11:
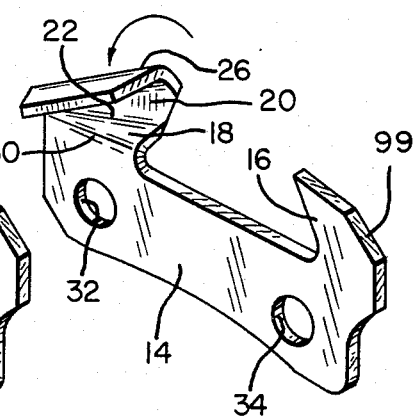
Figure 12:
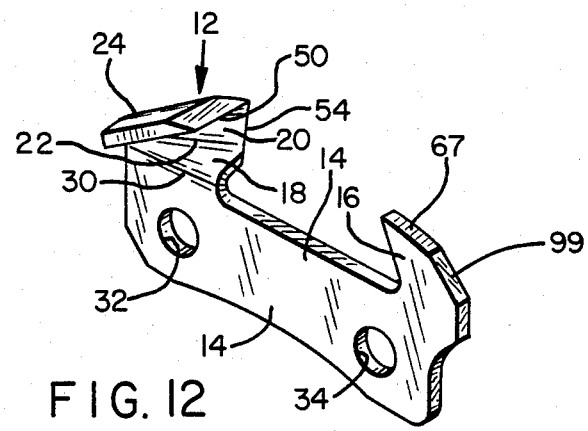

A preferred method of making the links 11 and 12 is to cut a blank 90 (FIG. 9) of sheet steel in soft condition, saw chain steel of about 0.043 inches thickness being one very satisfactory material, then stretch form an upper portion 91 (FIG. 10) about a vertical axis 92 at back edge portion 93 to provide the offset shank portion 18. Then, with a wiping and slight coining action, the upper portion 91 is bent at rounded portion 26. This completes the shaping of the link and it is then heat treated to harden it to a Rockwell hardness of from about 50 to about 65 on the Rockwell Scale C, it being feasible to make the teeth even as hard as 65 since filing is not required to sharpen the cutting edges 50 and 54.

After the hardening of the links 11 and 12, bottom face 48 of the top plate portion 24 and the inside face 52 of the side plate portion 20 are preferably plated with chromium, to provide very hard, wear resistant material for the cutting edges 50 and 54. Also, during use of these cutter links, the hard chromium surface is pressed by the wood being cut against the top plate portion 24 and the side plate portion 20 so that there is no tendency to peel off the chromium plating.

The top plate portion, proceeding from the bent portion 26 at its outer edge, is tilted upwardly somewhat so that the abrasion of the sharpenable surface 42, which actually lies in a portion of a cylinder centered on an axis normal to the body portion 14, causes the cutting edge 50 to extend somewhat rearwardly proceeding from the corner of point 40. This gives the cutting edge a slicing as well as a chiseling action.

To provide the hook shape of the side cutting edge 54, the side plate portion 20 tilts outwardly, proceeding downwardly from the upper bent portion 26 to the lower bent portion 22. Then, when the side sharpenable surface 46 is ground in a substantially vertical plane, the side cutting edge 54 slopes somewhat rearwardly, proceeding downwardly therealong. This slope or hook is increased if the sharpening member is tilted inwardly as previously mentioned.

Figure 8:
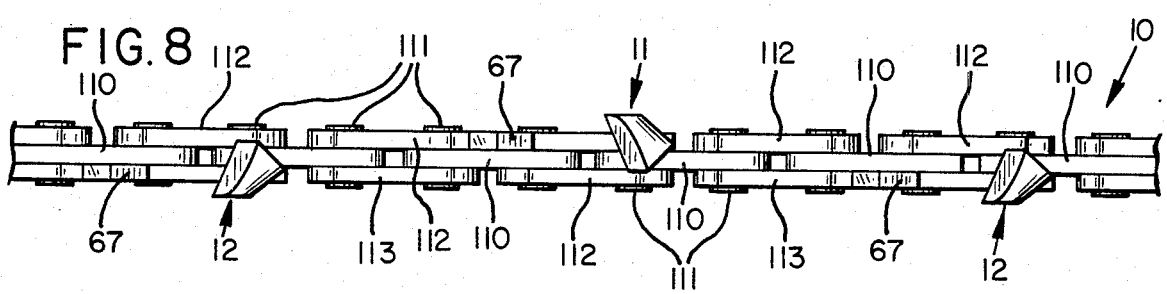
FIG. 8 is a fragmentary, top plan view of the saw chain of FIG. 7.

It will be understood that the chain 10 comprises an endless cutting device movable along an endless path in a predetermined, i.e. forward, direction according to the present invention, and that only a segment, one and one-half sequences, is shown in FIG. 7. The chain 10 includes driving links 110 connected by rivets 111 to the body portions 14 of the cutter links 11 and 12 and side links 112, and also connected to bumper links 113 positioned between the cutter links. Each top plate portion 24 extends back over the near side of the link body portion, and preferably over the longitudinal centerline or vertical center plane of the chain so that the top plate portions 24 of the links 11 and 12 overlap. For purposes of definition, the longitudinal centerline of the cutter link is taken as coincident with the longitudinal centerline of body portion 14 between rivet holes, and the pitch line or centerline of the saw chain or saw chain path is taken as said longitudinal centerline between rivet holes as extended along a saw bar. The vertical center plane of the chain is understood to include the chain centerline.

The bent edge portion 26 at the juncture of the side plate portion 20 and the top plate portion 24 so extends inwardly and downwardly that, as the top sharpening surface 42 and the side sharpening surface 46 are sharpened substantially equally, the point 40 is maintained substantially at the center of the inner surface 48. The bent edge portions 22 and 26 extend in somewhat converging directions, proceeding rearwardly therealong, so that the side plate portion narrows somewhat from front to rear. The side plate portion 20 while shown as substantially planar may instead be somewhat rounded.

The cutter link 11 of a constructed saw chain which operated very successfully is shown with its geometry in FIGS. 1-6. The angle A of the side plate portion 20 to the plane of the body portion 14 proceeding rearwardly, is about 30°. The side plate portion tilts inwardly proceeding upwardly at an angle of about 10° to the vertical, while the angle of the top cutting edge 50 relative to a line 79 normal to the body portion is 22°. The angle of the top plate portion 24 to the body portion 14 is 111°. The shank portion 18 is sloped at an angle of about 45° to the body portion 14, and the angle C of the side cutting edge 54 relative to the vertical is about 22°. The thickness of the chromium plating on the lower face 44 of the top plate portion 24 and on the inner face 52 of the side plate portion is about 0.0004 inches, the link being hardened to a hardness of about 56 on the Rockwell C Scale. The side sharpenable surface 46 may be disposed in a substantially vertical plane parallel to line 70 and to body portion 14. A sloping forward corner portion 99 was provided on the depth guage 16 to lessen the abrupt interference with wood being cut, particularly in boring.

The top plate portion 24, the side plate portion 20 and the shank portion 18, in transverse cross-section, are concave and roughly in the form of a "C" having a combined concave inner surface, as hereinbefore mentioned, and which may vary from a substantially uniform curvature to a configuration highly angled at the bent portions. It is the combined C-shaped tooth having the sloped configuration as herein described and claimed which provides the advantages of a sturdy chisel-type cutter link but which is nevertheless easily sharpenable.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

What is claimed is:

1. A cutter for an endless cutting device movable along an endless path in a forward direction for cutting a kerf in material such as wood, said cutter in an upright position having forward and rearward ends with respect to said direction comprising:
   a body portion disposed in a predetermined vertical plane,
   a side plate portion joined to said body portion and extending upwardly from and positioned to one side of said body portion, said side plate portion, from front to rear thereof, sloping inwardly at an acute angle with respect to said plane,
   said side plate portion adjacent its forward end having an outer surface, an inner surface, and an outwardly facing sharpenable work engaging forward end surface intersecting said inner surface at an acute angle to define a forward side cutting edge on said side plate portion, and
   a top plate portion integral with and extending inwardly from an upper part of said side plate portion, said top plate portion, from front to rear thereof, sloping downwardly,
   said top plate portion having an upper surface, a lower surface, and an upwardly facing sharpenable forward end surface intersecting said lower surface of said top plate portion at an acute angle to define a forward top cutting edge for said top plate portion, said cutting edge functioning to cut and lift material from the kerf being cut.

2. The cutter according to claim 1 wherein the forward side cutting edge on said side plate portion and the forward cutting edge on said top plate portion intersect to form a sharp corner.

3. The cutter according to claim 1 wherein the forward end surfaces of said side plate portion and said top plate portion are of a predetermined hardness while the inner surface of said side plate portion and the lower surface of said top plate portion are harder than said hardness.

4. The cutter according to claim 1 wherein the side plate portion is substantially planar.

5. The cutter according to claim 1 wherein the forward side cutting edge on said plate portion extends downwardly and rearwardly.

6. The cutter according to claim 5 wherein said side plate portion, proceeding upwardly, slopes somewhat inwardly.

7. The cutter according to claim 5 wherein the cutting edge on said side plate portion forms an angle of between about 0° and about 25° with a plane vertical.

8. The cutter according to claim 7 wherein said angle is about 22°.

9. The cutter according to claim 1 wherein said top plate portion forms an angle of between about 30° and 40° with the horizontal plane.

10. The cutter according to claim 1 wherein the side plate portion forms an angle of between about 30° and 40° with said vertical plane.

11. The cutter according to claim 1 wherein the outwardly facing forward end surface of said side plate portion, proceeding rearwardly, slopes inwardly.

12. A cutter for an endless cutting device movable along an endless path in a forward direction for cutting a kerf in material such as wood, said cutter in an upright position comprising:
   a body portion disposed in a predetermined vertical plane,
   a side plate portion joined to said body portion and extending upwardly from and positioned to one side of said body portion, said side plate portion from the forward end to the rearward end thereof sloping inwardly with respect to said plane, said side plate portion adjacent its forward end having an outer face and an inner face, and an outwardly directed, sharpenable work engaging forward end surface between the outer face and the inner face, said inner face intersecting said end surface of said side plate portion at an angle, because of the inward sloping of said side plate portion, to define a substantial side cutting edge where it intersects said end surface of said side plate portion, and
   a top plate portion integral with said side plate portion and extending inwardly from the upper part of said side plate portion, said top plate portion from the forward end to the rearward end thereof sloping downwardly, said top plate portion having an upper face and a lower face, and an upwardly directed, sharpenable forward end surface between the upper face and the lower face, said lower face intersecting said end surface of said top plate portion at an angle, because of the downward sloping of said top plate portion, to define a substantial top cutting edge where it intersects said end surface of said top plate portion, said top cutting edge functioning to cut and lift the material from the kerf being cut.

13. The cutter according to claim 12 wherein said side cutting edge and said top cutting edge intersect at an outermost sharp corner.

14. In a cutter link adapted to be assembled into a saw chain adapted to be driven in a forward direction for cutting a kerf in material such as wood,
   a base portion,
   and a cutter portion integral with the base portion, the cutter portion having a shank portion extending laterally outwardly from the base portion, a cutter side plate portion extending upwardly from the shank portion, and a cutter top plate portion extending inwardly from the cutter side plate portion back over the base portion, the shank portion, the cutter side plate portion and the cutter top plate portion combined being generally C-shaped in transverse cross section and having a concave inner surface, the cutter side plate portion, from the forward end to the rearward end thereof, sloping inwardly, the cutter top plate portion, from the forward end to the rearward end thereof and outwardly from the inner edge thereof, sloping downwardly, the cutter side plate portion having an outwardly facing forward end surface which intersects said concave inner surface at an acute angle to form a side cutting edge substantially outermost on said cutter side plate portion, and the cutter top plate portion having an upwardly facing forward end surface which intersects said concave inner surface at an acute angle to form a top cutting edge, said cutting edge functioning to cut and lift material from the kerf being cut.

15. In a cutter for an endless cutting device movable along an endless path in a predetermined vertical plane and direction, a side plate portion positioned to one side of said plane, said side plate portion having an outer face and an inner face, the forward end of said side plate portion between the outer face and the inner face being outwardly directed making an acute angle with the inner face of the side plate portion to provide a sharpenable side cutting edge where it intersects said inner face of the side plate portion, said side plate portion extending inwardly and rearwardly at an angle to said plane for defining said side cutting edge between said inner face and said forward end of said side plate portion, and for positioning said sharpenable side cutting edge substantially outermost on said side plate portion, and a top plate portion integral with and extending inwardly from the upper part of said side plate portion, said top plate portion having an upper face and a lower face, the forward end of said top plate portion between the upper face the the lower face being upwardly directed making an acute angle with the lower face of the top plate portion to provide a top cutting edge where it intersects said lower face of the top plate portion, said top plate portion extending downwardly and rearwardly at an acute angle to the path of said cutting device, said top plate portion also extending downwardly and outwardly said inner face of said side plate portion and said lower face of said top plate being concave.

16. The cutter according to claim 15 wherein said side plate portion, proceeding upwardly, slopes inwardly.

17. In a completely outside sharpenable cutter adapted to be assembled into a saw chain and driven in a predetermined direction, a body portion having a centerline, a side plate portion joined to said body portion and located laterally outwardly and upwardly with respect to one side of said body portion, said side plate portion being angled inwardly from front to back and having an inside surface and an outer side which near the front of said side plate portion faces away from said centerline, said side plate portion having a predetermined thickness between said inside surface and said outer side, a top plate portion extending from the upper part of said side plate portion back over said one side of the body portion, said top plate portion being angled downwardly from front to back and having an inside surface and an upper side facing away from said centerline, a portion of the cutter above said body portion being generally a C-shaped in transverse cross section portion defining a concave inner surface including the inside surface of said side plate portion and the inside surface of said top plate portion, said side plate portion having an outwardly facing forward end surface intersecting said concave inner surface to provide an outermost side cutting edge on said side plate portion, and said top plate portion having an upwardly facing forward end surface intersecting said concave inner surface to provide a top cutting edge for said top plate portion.

18. In a saw chain movable along an endless path in a predetermined direction, said saw chain having a centerline, a completely outside sharpenable cutter comprising a substantially flat body portion having opposite side surfaces extending substantially parallel to said centerline, a side plate portion extending to one side of the said centerline, said side plate portion having an outer side surface and an inside surface in parallel relation to said outer side surface, and an outwardly facing, forward end surface, said inside surface of said side plate portion extending rearwardly and inwardly at an acute angle from said end surface, said inside surface intersecting said end surface to define an outermost, forward, side cutting edge on said side plate portion, a top plate portion integral with the side plate portion and extending from the side plate portion across said centerline, the top plate portion having an upper side surface, a bottom surface, and an upwardly facing forward end surface, said top plate portion extending rearwardly and downwardly at an acute angle toward said body portion from the forward end surface of said top plate portion, said bottom surface intersecting said upwardly facing forward end surface to define an uppermost, forward, top cutting edge for said top plate portion, and an offsetting shank portion joining the body portion and the side plate portion said top plate portion, said side plate portion and said shank portion in transverse cross-section being concave.

19. The cutter according to claim 18 wherein the top plate portion forms an angle of between about 30° and 40° with the horizontal.

20. The cutter according to claim 18 wherein the side plate portion forms an angle of between about 30° and 40° with the plane of said body portion.

21. A saw chain tooth comprising:

a substantially flat body portion having a longitudinal centerline,
a side plate portion,
a shank portion joining the body portion and the side plate portion, the side plate portion extending rearwardly at an acute angle relative to the body portion and having parallel inner and outer surfaces,
the side plate portion having an outwardly facing forward end surface, said inner surface of said side plate portion angularly intersecting said outwardly facing forward end surface of said side plate portion to form a side cutting edge, and
a top plate portion joined at one side edge to the side plate portion, said top plate portion having an inner surface and an upwardly facing forward end surface forming a top cutting edge with the inner surface of the top plate portion said inner surfaces define a continuous concave surface.

* * * * *

UNITED STATES PATENT AND TRADEMARK OFFICE
CERTIFICATE OF CORRECTION

PATENT NO. : 4,535,667
DATED      : August 20, 1985
INVENTOR(S) : Duane M. Gibson and Lewis A. Scott It is certified that error appears in the above-identified patent and that said Letters Patent is hereby corrected as shown below:

In [63] (Related U.S. Application Data), line 3, "Aug. 7, 1979" should be --May 7, 1979--.

Column 5, line 20, "by" (first occurrence) should be --be--.

Column 5, line 48, "are" should be --or--.

Column 7, line 9, "guage" should be --gauge--.

Claim 7, column 8, line 13, "plane vertical" should be --vertical plane--.

Claim 15, column 9, line 47, "the the" should be --and the--.

Claim 17, column 10, line 13, delete "a" before --C-shaped--.

Claim 17, column 10, line 14, delete "portion".

Signed and Sealed this

Seventh Day of January 1986

[SEAL]

Attest:

DONALD J. QUIGG

Attesting Officer

Commissioner of Patents and Trademarks